United States Patent Office 2,841,520
Patented July 1, 1958

2,841,520

PESTICIDAL PHOSPHORUS ESTERS

Joe R. Willard and John F. Henahan, Middleport, N. Y., assignors to Food Machinery and Chemical Corporation, New York, N. Y., a corporation of Delaware No Drawing. Application July 16, 1956
Serial No. 597,887

10 Claims. (Cl. 167—22)

This invention relates to novel pesticidal compositions, and particularly to compositions which are useful as insecticides, acaricides and ovicides. More specifically the invention relates to compositions containing as the essential active ingredient a disubstituted bis(S-(dialkoxyphosphinothioyl)mercapto) methane, and to the use of these compositions for pesticidal purposes.

It has been discovered that the disubstituted bis(S-(dialkoxyphosphinothioyl) mercapto) methanes possess unique activity in that they function as effective active ingredients in insecticidal compositions, acaricidal compositions and ovicidal compositions. The subject compounds have the general formula

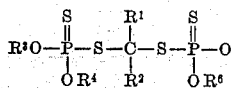

wherein $R^1$ and $R^2$ are organic radicals and other groups, including chloro, nitro and the like, and $R^3$, $R^4$, $R^5$ and $R^6$ are organic radicals.

It has been discovered that a large variety of substituted methylene esters of the type described may be prepared from a methylene dihalide having the general formula

or a methyne trihalide having the general formula

wherein X, Y and Z are chlorine or bromine. The R groups of said halides may be hydrocarbon radicals such as alkyl, aryl, cycloalkyl, aralkyl, alkaryl and the like, or substituted hydrocarbons, containing groups such as chloro, bromo, nitro, alkoxy, hydroxy and the like, or functional groups such as carbalkoxy, carbamido, carbanalido, halogen, alkoxy, nitro, S-(dialkoxyphosphinothioyl)mercapto and the like.

The methylene dihalide or trihalide is condensed with a metallic salt of a thio- or dithiophosphoric acid, of the formula

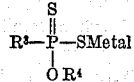

such as the alkali metal and alkaline earth salts and the ammonium and silver salts, generally in the presence of a solvent. The radicals $R^3$ and $R^4$ can be hydrocarbon radicals such as alkyl, cycloalkyl or aryl, for example, or they may be substituted hydrocarbons containing such substituents as chloro, bromo, alkoxy, nitro, and the like. Generally $R^5$ and $R^6$ correspond to $R^3$ and $R^4$, although they may be different if the reaction is carried out in more than one stage.

In the preferred process of this invention, two molar equivalents of the appropriate dialkoxyphosphorodithioic acid is dissolved in a solvent such as ethanol or dioxane, and a solution of the metal hydroxide is added until the pH is about 7. A 25–40% solution of potassium hydroxide in ethanol is a convenient reagent. A preformed salt of the phosphorus acid could also be used. In either case, to the neutral solution is added one molar equivalent of the desired methylene dihalide, and the mixture is heated until the reaction is complete—generally about 4–14 hours under reflux. The product is separated and tested for pesticidal activity.

Where one of the substituents on the methylene carbon is S-(dialkoxyphosphinothioyl)mercapto, three molar equivalents of the phosphorus acid is reacted with the methyne trihalide to produce a symmetrical product, as shown in Example 1 below. There are of course many modifications of these techniques which may be successfully employed by those skilled in the art, and which do not depart from the spirit and scope of the invention.

EXAMPLE 1

Tris (S - (diethoxyphosphinothioyl) mercapto) nitromethane.

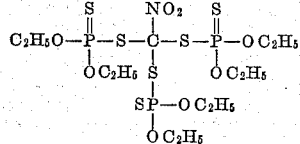

Three molar equivalents of O,O-diethyl hydrogen phosphorodithioate were neutralized by the addition of 20% ethanolic potassium hydroxide, the temperature being maintained below 50° C. during the addition. The major portion of the ethanol was removed under reduced pressure at 50°. An equal volume of dioxane was added to the residual salt. To the suspension of the potassium salt was added one molar equivalent of trichloronitromethane, while cooling with an ice bath. Vigorous evolution of brown gases occurred. The mixture was heated under reflux for three hours, and the dioxane removed at 50° under reduced pressure. The reaction mixture was washed with water, aqueous phases were extracted with ether and the ether extracts combined with the organic phase. The ether solution was dried overnight over anhydrous sodium sulfate, volatile materials removed to 50° C. under one millimeter of pressure and the liquid product filtered. The product was 0.66 molar equivalent of a deep red liquid having an $n_{25}D$ 1.5312.

Analysis.—Calcd. for $C_{13}H_{30}O_8P_3S_6$: P, 15.50. Found: P, 15.50.

EXAMPLE 2

Bis (S - diethoxyphosphinothioyl) mercapto) chloronitromethane.

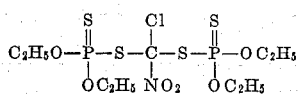

Two molar equivalents of O,O-diethyl hydrogen phosphorodithioate was neutralized by addition of 20% ethanolic potassium hydroxide, the temperature maintained below 50° C. during the addition, and to the neutral solution was added one molar equivalent of trichloronitromethane. The mixture was heated under reflux and the reaction product treated as described in Example 1 to give a 52% yield of a viscous liquid having an $n_{25}D$ 1.5458. Calcd. for $C_9H_{20}ClNO_6P_2S_4$: S, 27.89. Found: S, 28.46.

EXAMPLE 3

Tris (S - (diethoxyphosphinothioyl) mercapto) (phenyl)methane.

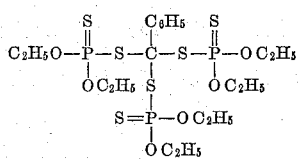

Following the procedure of Example 1, 3 molar equivalents of O,O-diethyl hydrogen phosphorodithioate were reacted with 1 molar equivalent of trichloromethylbenzene. A 66% yield of a viscous liquid having $n_{25}D$ 1.5350 was obtained. Calcd. for $C_{19}H_{35}O_6P_3S_6$: P, 14.41. Found. P, 14.02.

The compounds of this invention were evaluated for pesticidal activity. It was found that all were not equivalent in activity, but that some were superior as insecticides, some as acaricides and some as ovicides, and that some showed systemic activity as well. Some of the compounds in this group showed an unusually broad range of activity characterized by high toxicity.

The pesticidal compositions may be formulated as aqueous emulsions, as dry or wettable powders, as solutions, or in any other suitable vehicle. The compositions can be utilized as sprays, as dusts, as aerosol mixtures, insecticidal coating compositions, and as residues. In general, they can be applied by methods commonly used for control or eradication of insects, mites and the like. Thus, these compositions may be formulated with solvents, diluents, and carrier media, adhesives, spreading, wetting and emulsifying agents and other ingredients.

A typical formulation used in evaluating the toxicants of this invention is a wettable powder containing 25% of the candidate pesticide, 72% Attaclay (fuller's earth) and 3% of an alkyl aryl polyether alcohol as wetting agent. This wettable powder is applied to plant foilage as an aqueous suspension, by spraying. The treated plants are infested and observations made at intervals to determine the efficacy of the compounds as toxicants.

Insects used in the testing included the German roach (*Blattela germanica* (L.)), Mexican bean beetle (*Epilachnia varivestis* Muls.), southern armyworm (*Prodenia eridania* (Cram.)) and two-spotted mite (*Tetranychus bimaculatus* Harvey.)

Table 1 below represents the results of screening tests of representative compounds of this invention. Some of these compounds exhibited residual, slow acting or ovicidal activity.

To measure residual activity, horticultural bean plants were dipped in aqueous suspensions of wettable powder formulations of the test materials and the plants allowed to dry. After seven and twelve days plants are infested, and counts taken of the percent killed. A plus (+) sign in Table 1 indicates significant residual activity.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A compound of the formula

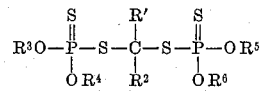

wherein R' and $R^2$ are different radicals selected from the group consisting of chloro, nitro, S-(di-lower-alkoxyphosphinothioyl)mercapto and phenyl radicals, and $R^3$, $R^4$, $R^5$ and $R^6$ are lower alkyl radicals.

2. Bis(S - [diethoxyphosphinothioyl]mercapto)chloronitromethane of the formula

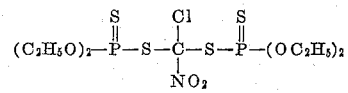

3. Tris(S - [diethoxyphosphinothioyl]mercapto) nitromethane of the formula

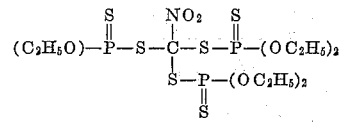

4. Tris(S - [diethoxyphosphinothioyl]mercapto) phenyl)methane of the formula

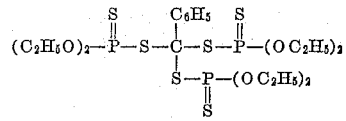

5. A pesticidal composition comprising a toxic concentration of a compound of claim 1 and an inert pesticidal adjuvant as carrier therefor.

6. A pesticidal composition comprising a toxic concentration of the compound bis(S-[diethoxyphosphinothioyl]mercapto)chloronitromethane and an inert pesticidal adjuvant as carrier therefor.

7. A pesticidal composition comprising a toxic concentration of the compound tris(S-[diethoxyphosphino-

*Table 1.—Pesticidal activity of phosphinothioylmercaptomethanes*

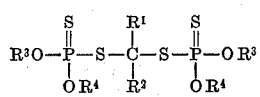

| Compound | | | | Percent Kill at 1,250 p. p. m. | | | | | |
|---|---|---|---|---|---|---|---|---|---|
| $R^3$ | $R^4$ | R' | $R^2$ | Two-spotted Mites | | | German Roach | Mexican Bean Beetle | |
| | | | | Adults | Nymphs | Residual | | Adults | Residual |
| —$C_2H_5$ | —$C_2H_5$ | —$NO_2$ | —Cl | 100 | 95 | + | 0 | 75 | + |
| —$C_2H_5$ | —$C_2H_5$ | —$NO_2$ | —S—P(=S)—$(OC_2H_5)_2$ | 100 | 100 | + | 95 | 75 | + |
| —$C_2H_5$ | —$C_2H_5$ | —$C_6H_5$ | —S—P(=S)—$(OC_2H_5)_2$ | 35 | 0 | ------ | 0 | 0 | ------ | thioyl]mercapto)nitromethane and an inert pesticidal adjuvant as carrier therefor.

8. A method of controlling mite and insect pests comprising contacting said pests with a effective concentration of a compound of claim 1.

9. A method of controlling mite and insect pests comprising contacting said pests with an effective concentration of the compound bis(S-[diethoxyphosphinothioyl]-mercapto)chloronitromethane.

10. A method of controlling mite and insect pests comprising contacting said pests with an effective concentration of the compound tris(S-[diethoxyphosphinothioyl]-mercapto)nitromethane.

References Cited in the file of this patent

UNITED STATES PATENTS 2,736,737    Morris _____ Feb. 28, 1956

UNITED STATES PATENT OFFICE
CERTIFICATE OF CORRECTION

Patent No. 2,841,520                                                  July 1, 1958

Joe R. Willard et al.

It is hereby certified that error appears in the printed specification of the above numbered patent requiring correction and that the said Letters Patent should read as corrected below.

Column 1, lines 62 to 65, the formula should appear as shown below instead of as in the patent:

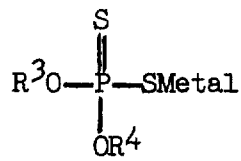

Signed and sealed this 1st day of March 1960.

(SEAL)
Attest:

KARL H. AXLINE                                                                    ROBERT C. WATSON
Attesting Officer                                                                 Commissioner of Patents